United States Patent
Claxton (10) Patent No.: US 10,701,205 B2
(45) Date of Patent: Jun. 30, 2020

(54) COMMUNICATIONS NETWORK (71) Applicant: BRITISH TELECOMMUNICATIONS PUBLIC LIMITED COMPANY, London (GB)

(72) Inventor: Robert Claxton, London (GB)

(73) Assignee: BRITISH TELECOMMUNICATIONS public limited company, London (GB)

( * ) Notice: Subject to any disclaimer, the term of this patent is extended or adjusted under 35 U.S.C. 154(b) by 0 days.

(21) Appl. No.: 16/498,679

(22) PCT Filed: Apr. 3, 2018

(86) PCT No.: PCT/EP2018/058458
§ 371 (c)(1),
(2) Date: Sep. 27, 2019

(87) PCT Pub. No.: WO2018/178393
PCT Pub. Date: Oct. 4, 2018

(65) Prior Publication Data
US 2020/0045169 A1 Feb. 6, 2020

(30) Foreign Application Priority Data

Mar. 30, 2017 (EP) ..................... 17163914

(51) Int. Cl.
*H04M 3/436* (2006.01)
*H04M 3/22* (2006.01)
*H04M 3/42* (2006.01)

(52) U.S. Cl.
CPC ......... *H04M 3/436* (2013.01); *H04M 3/2218* (2013.01); *H04M 3/42059* (2013.01); *H04M 2203/556* (2013.01)

(58) Field of Classification Search
CPC .......... H04M 3/2218; H04M 3/42059; H04M 3/436; H04M 2203/556
(Continued)

(56) References Cited

U.S. PATENT DOCUMENTS

| 7,283,808 B2 * | 10/2007 | Castell | H04L 51/36 370/401 |
| 7,577,239 B1 * | 8/2009 | Shim | H04M 3/436 379/114.04 |

(Continued)

FOREIGN PATENT DOCUMENTS

GB 2 425 913 11/2006

OTHER PUBLICATIONS

S. Chiappetta, et al., "An anomaly-based approach to the analysis of the social behaviour of VoIP users", Computer Networks, The International Journal of Computer and Telecommunications Networking, Feb. 2013, vol. 57, pp. 1545-1559.

Kentaroh Toyoda, et al., "SPIT Callers Detection with Unsupervised Random Forests Classifier", 2013 IEEE International Conference on Communications (ICC), pp. 2068-2072.

(Continued)

*Primary Examiner* — Hemant S Patel
(74) *Attorney, Agent, or Firm* — Nixon & Vanderhye P.C.

(57) ABSTRACT

A method of classifying unwanted robot calls on the basis of the duration of a plurality of calls made from a single telephone number. If analysis of the distribution of call duration indicates that the calls are robot calls then the single telephone number is flagged such that subsequent calls from that number are not connected to the called party.

13 Claims, 5 Drawing Sheets

(58) Field of Classification Search
USPC .......................................................... 379/70
See application file for complete search history.

(56) References Cited

U.S. PATENT DOCUMENTS

| | | | | |
|---|---|---|---|---|
| 9,014,359 | B1* | 4/2015 | Pfeffer ................. | H04M 3/436 379/211.02 |
| 2009/0202057 | A1* | 8/2009 | Tartarelli .......... | H04L 29/06027 379/142.04 |
| 2012/0321064 | A1* | 12/2012 | Czachor, Jr. .......... | H04M 3/436 379/210.02 |
| 2015/0003600 | A1* | 1/2015 | Bucko ................. | H04M 3/436 379/210.02 |
| 2015/0249737 | A1* | 9/2015 | Spievak ................ | H04M 3/436 379/189 |
| 2016/0337495 | A1* | 11/2016 | Akita .................... | H04M 1/663 |
| 2016/0360036 | A1* | 12/2016 | Ansari .................. | H04M 3/436 |
| 2017/0163803 | A1* | 6/2017 | Russell ................ | H04M 3/436 |

OTHER PUBLICATIONS

Pedro O.S. Vaz De Melo, et al., "Surprising Patterns for the Call Duration Distribution of Mobile Phone Users", ECML PKDD'10 Proceedings of the 2010 European conference on Machine learning and knowledge discovery in databases: Part III, Sep. 20-24, 2010, pp. 354-369.
David Waiting, et al., "A Multilayered Architecture for Preventing Automated Spam in the IP Multimedia Subsystem", IEEE GLOBECOM 2007—IEEE Global Telecommunications Conference, Nov. 26-30, 2007, pp. 2140-2145.
Combined Search and Examination Report for GB Application No. 1705110.3 dated Aug. 21, 2017, 7 pages.
Extended European Search Report for GB Application No. 17163914. 9-1853 dated Sep. 20, 2017, 8 pages.
International Search Report for PCT/EP2018/058458 dated Jun. 14, 2018, 3 pages.
Written Opinion of the ISA for PCT/EP2018/058458 dated Jun. 14, 2018, 6 pages.

* cited by examiner

COMMUNICATIONS NETWORK

This application is the U.S. national phase of International Application No. PCT/EP2018/058458 filed Apr. 3, 2018 which designated the U.S. and claims priority to EP Patent Application No. 17163914.9 filed Mar. 30, 2017, the entire contents of each of which are hereby incorporated by reference.

FIELD OF THE INVENTION

The present invention relates to a method of classifying telephone calls, and in particular to a method of classifying telephone calls such that automated telephone calls can be detected.

BACKGROUND TO THE INVENTION

Automated unwanted telephone calls have become problematic for many users and it is known to use telephone answering machines or systems to block calls which are from unidentified numbers, which are from numbers held in a blacklist (or alternatively are not present on a whitelist), or which are from numbers of a particular category (for example international calls). An example of such a system is disclosed in GB-B-2 425 913. However, it would be preferable if such calls could be blocked within the operator's networks, such that the customer does not need to take significant action or acquire specific equipment in order to not be disturbed by the automated unwanted calls.

Automated unwanted calls are typically initiated by a computer dialler and, when answered, a pre-recorded message is played back to the called party. If the called party does not respond at the end of the pre-recorded message, for example by pressing a button in response to an option set out in the pre-recorded message, then the call will automatically terminate. It will be understood that a bank of computer diallers can generate a significant number of calls within a limited period of time.

SUMMARY OF THE INVENTION

According to a first aspect of the invention, there is provided a method of processing a call in a communications network, the method comprising the steps of: determining the duration of a call for each of a plurality of calls from a first network identity; generating a distribution of call durations; classifying the plurality of calls from the first network identity in accordance with the distribution of call durations; routing further calls from the first network identity in accordance with the classification of the plurality of calls.

A call may be further classified as an unwanted automated call if: the distribution of call duration values comprises two or more peaks; the first peak in the distribution of call duration values occurs at a time of less than 10 seconds; the median call duration is less than 20 seconds; the final peak in the distribution of call duration values occurs at a time of greater than 25 seconds; the final peak in the distribution of call duration values occurs at a time of less than 50 seconds; or if the final peak in the distribution of call duration values occurs at or after the 75th percentile of the distribution of call duration values.

A call which is classified as an unwanted automated call may be delivered to a voicemail server. In such an event, a notification may be transmitted to a further communications address associated with the original called number. A call which is not classified as an unwanted automated call may be delivered to the original called number.

According to a second aspect of the invention, there is provided a computing terminal configured to execute any of the methods listed above.

According to a third aspect of the invention, there is provided data carrier device comprising computer executable code for performing any of the methods listed above.

BRIEF DESCRIPTION OF THE FIGURES

In order that the present invention may be better understood, embodiments thereof will now be described, by way of example only, with reference to the accompanying drawings in which.

DETAILED DESCRIPTION OF EMBODIMENTS

Figure 1:
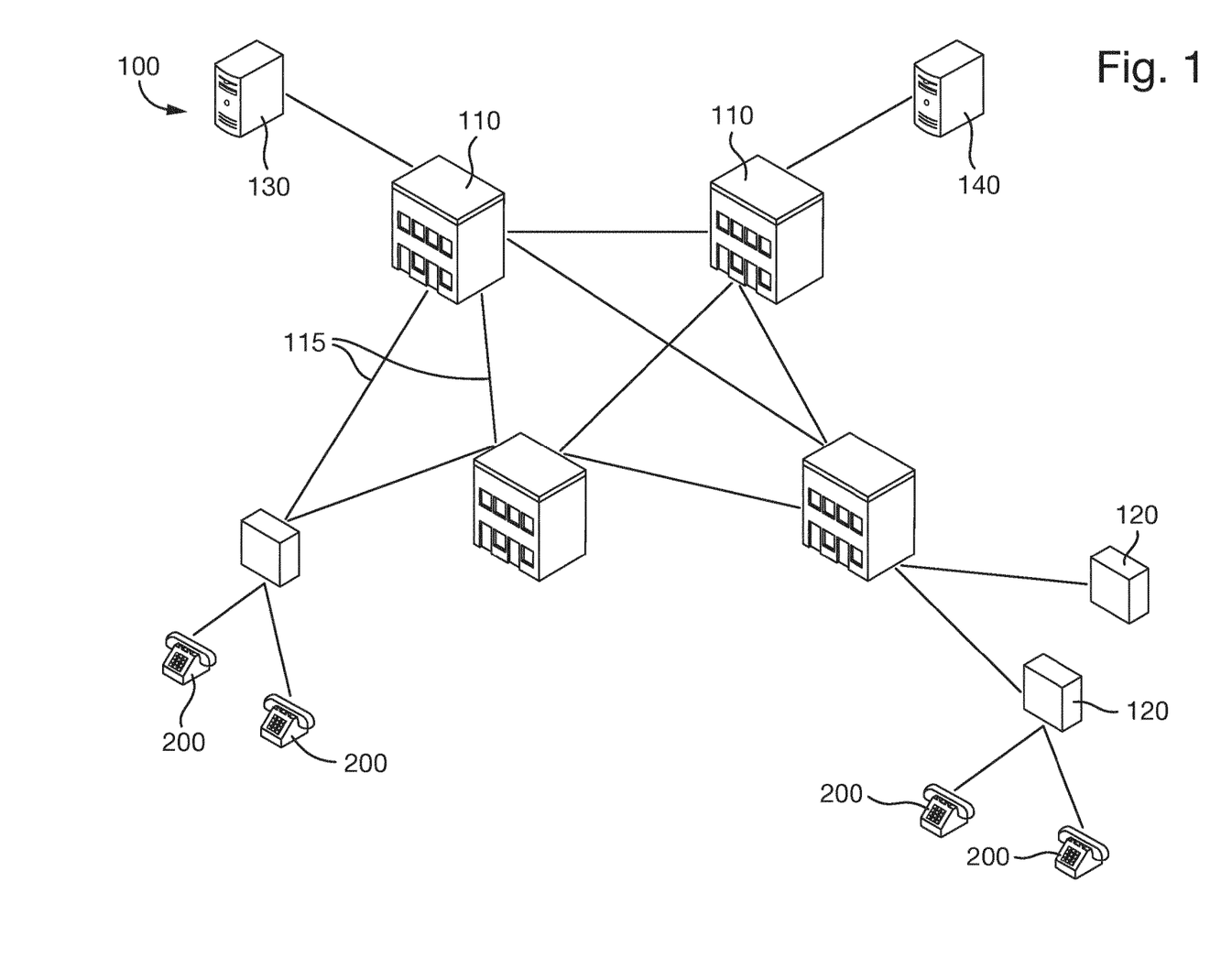
FIG. 1 shows a schematic depiction of a conventional telephony network.

FIG. 1 shows a schematic depiction of a conventional telephony network 100 in which a plurality of core exchanges 110 are interconnected by a plurality of communications links 115. Each of the plurality of core exchanges 110 are further connected to one or more local exchanges 120 by further communications links (for the sake of clarity in FIG. 1, not all of the core exchanges are shown as being connected to local exchanges) and customers' telephony terminals 200 are connected to one of the plurality of local exchanges. As is well understood, a call can be made from a first telephony terminal to a second telephony terminal with the call being routed via a local exchange, if both telephony terminals are connected to the same local exchange or via a local exchange, one or more core exchanges and a second local exchange. The network 100 will also comprise one or more domestic gateways 130 which allow calls from other telephony networks in that country to be routed to the telephony terminals connected to the telephony network 100, and vice versa. Similarly, the telephony network 100 will further comprise one or more international gateways 140 which allow calls from other international telephony networks to be routed to the telephony terminals connected to the telephony network 100, and vice versa.

Figure 2A:
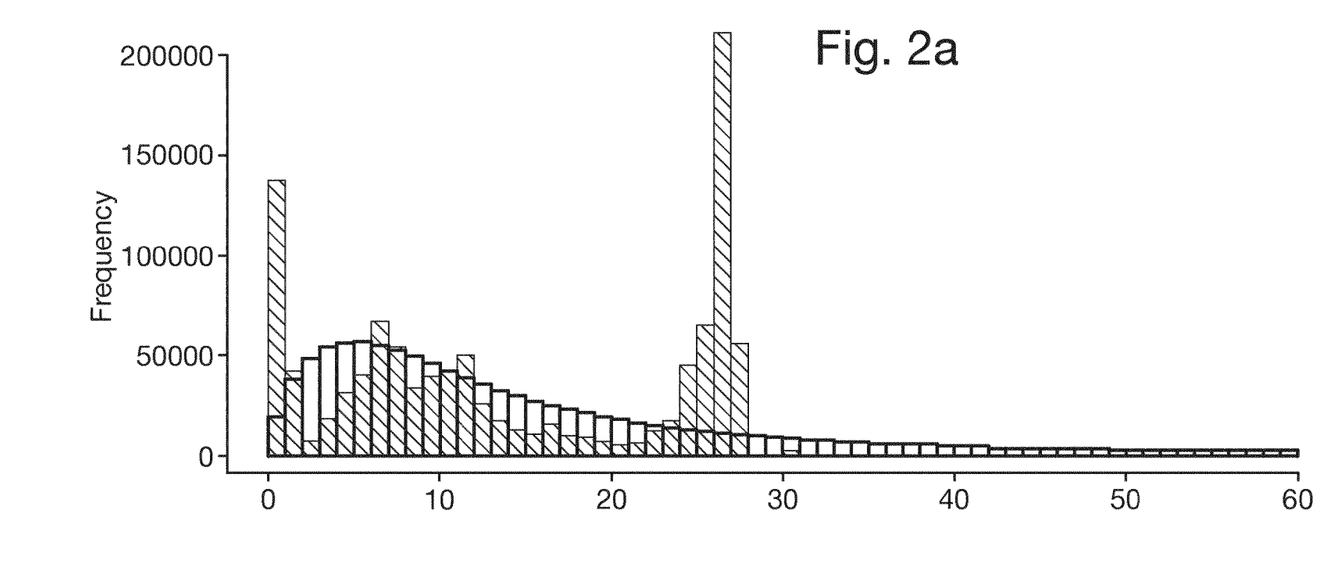
FIG. 2 shows graphical depictions of the distribution of call durations for robot and non-robot calls.
Figure 2B:
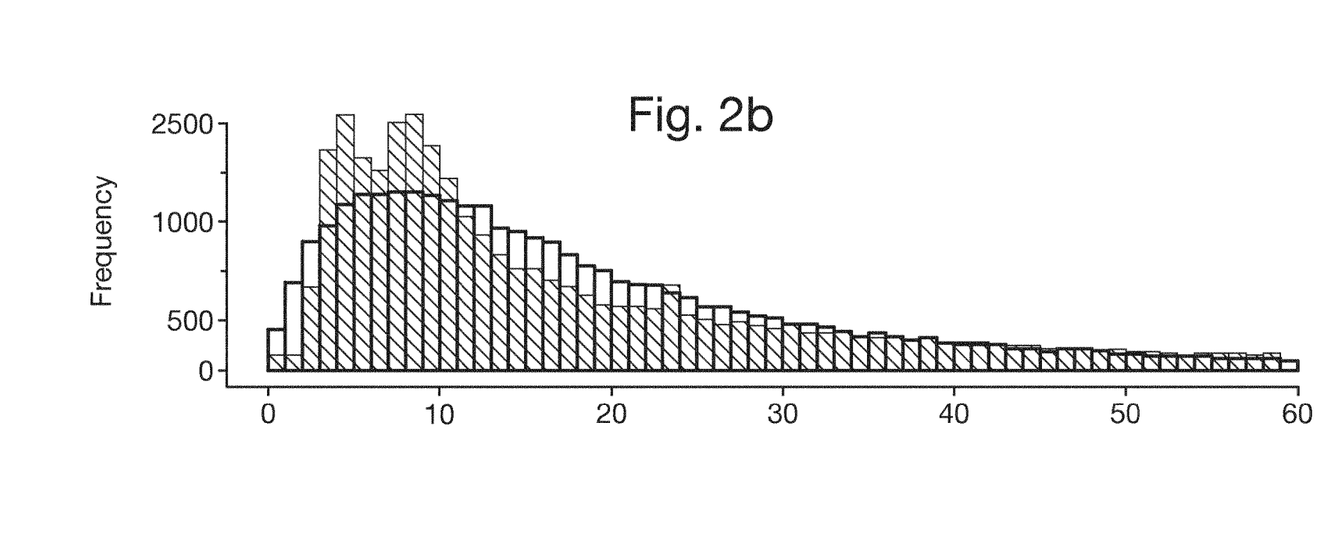

FIG. 2 shows graphical depictions of the of the distribution of call durations for robot and non-robot calls: FIG. 2a shows the distribution of call durations for calls which are believed to be unwanted automated calls (hereinafter 'robot calls' and FIG. 2b shows the distribution of call durations for non-automated calls (hereinafter 'non-robot calls'). Recent work (De Melo et al, "Surprising patterns for the call duration distribution of mobile phone users", Joint European Conference on Machine Learning and Knowledge Discovery in Databases, Springer; 2010. pp. 354-369) suggests a truncated log-logistic model works well for capturing the distribution of mobile call durations and FIGS. 2a & 2b show the actual call duration with the shaded columns and the truncated log-logistic model for the call duration data is shown using the unshaded. It can be seen from FIG. 2 that there is a significantly better fit for the truncated log-logistic model for the non-robot calls (FIG. 2*b*) than there is for the robot calls (FIG. 2*a*). Table 1 below shows data from a number of distributions of robot calls.

TABLE 1

Robot call duration data

| Distribution | Number of peaks | Median (seconds) | 75th percentile (seconds) | First peak (seconds) | Last peak (seconds) |
| --- | --- | --- | --- | --- | --- |
| 1 | 3 | 4 | 22 | 2.00 | 31.8 |
| 2 | 2 | 4 | 9 | 3.55 | 43.5 |
| 3w | 4 | 12 | 27 | 2.00 | 26.8 |
| 4 | 3 | 12 | 30 | 2.00 | 29.9 |
| 5 | 3 | 7 | 35 | 2.00 | 45.0 |
| 6 | 3 | 19 | 31 | 4.32 | 30.7 |
| 7 | 3 | 5 | 21 | 2.00 | 27.2 |
| 8 | 2 | 4 | 29 | 2.00 | 29.1 |

It can be seen that that each of the distributions of robot call duration comprises two or more peaks. Typically there is a first peak very early in the distribution (the minimum call duration is constrained to 2 seconds), followed by a second peak at around 7 seconds and a final peak at around 25-40 seconds. The first peak may be partially caused by the call being answered manually and the call being terminated by the called party almost immediately. Other reasons for the first peak may include the calling party terminating the call, for example if it detects that the call is answered by an answering machine or because the calling party wished to have the CLI of the calling party logged by the called party. The second peak is likely to be caused by the called party answering the call and then terminating it once they have determined that it is not of interest to them. The final peak is believed to represent calls which are answered automatically, that is by answering machines or voice mail services, which therefore allow the robot call to play out in its entirety. This supposition is reinforced as there are very few calls which terminate after the final peak, which is to be expected if the robot message has a fixed duration.

Table 2 below shows the same data parameters for a number of distributions of non-robot calls:

TABLE 2

Non-robot call duration data

| Distribution | Number of peaks | Median (seconds) | 75th percentile (seconds) | First peak (seconds) | Last peak (seconds) |
| --- | --- | --- | --- | --- | --- |
| 1 | 1 | 105 | 232 | 27.60 | 27.60 |
| 2 | 1 | 184 | 486 | 25.20 | 25.20 |
| 3 | 1 | 14 | 32 | 7.81 | 7.81 |
| 4 | 1 | 8 | 24 | 5.10 | 5.10 |
| 5 | 1 | 6 | 13 | 3.55 | 3.55 |
| 6 | 1 | 7 | 20 | 4.32 | 4.32 |
| 7 | 1 | 7 | 20 | 4.32 | 4.32 |

It can be seen from Table 2 that the non-robot call distributions comprise a single peak, which occurs before the median value of the distribution. In contrast the final peak in the robot call distributions (see Table 1 above) tends to occur at, or after, the 75th percentile of the distribution (distribution 2 shows the peak occurring significantly after the 75th percentile value).

The peak finding is based on the MALDIquant package for R (which is a software environment for statistical computing and graphics), which was designed for finding peaks in mass spectrometry data. A narrow halfWindowSize was used in an attempt to not miss closely spaced peaks. In doing so, peaks with a very low intensity needed to be rejected. This was achieved by imposing a threshold value based on the test data distributions. Appendix A below shows the code used to identify the peaks.

Figure 3A:
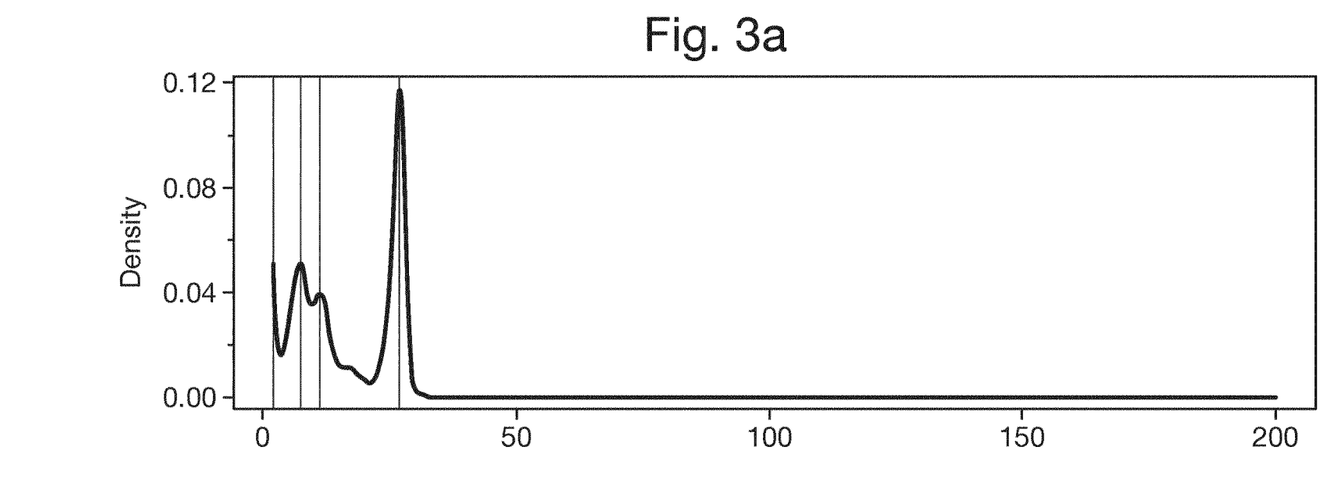
FIG. 3 shows graphical depictions of the results which are obtained when the data shown in FIG. 2 is processed to detect peaks.
Figure 3B:
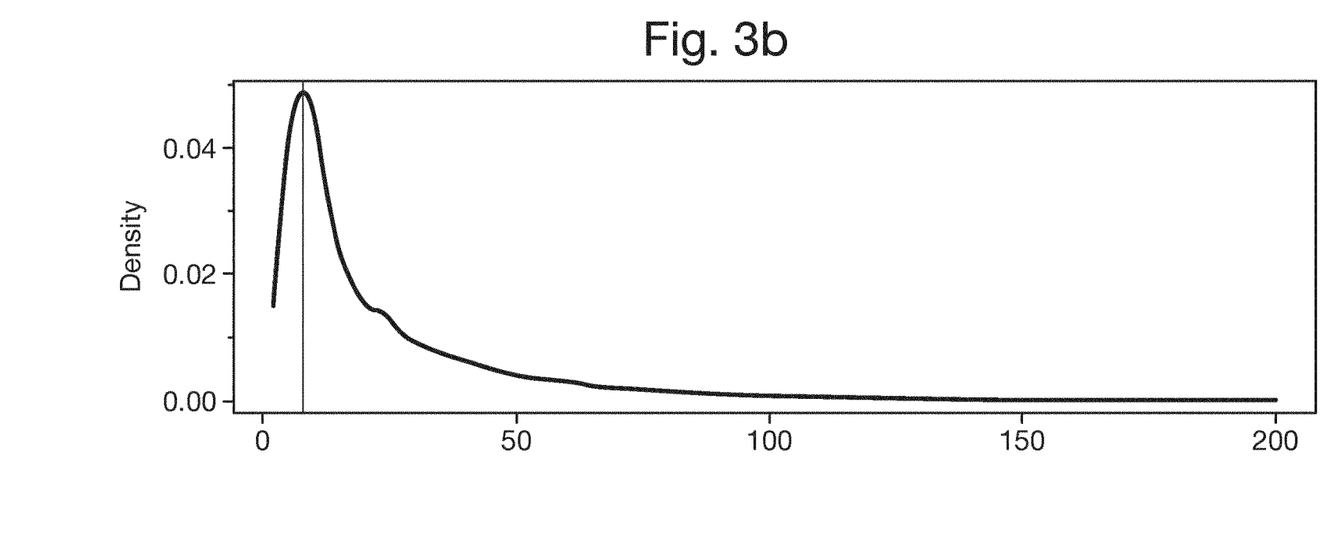

FIG. 3 shows graphical depictions of the results which are obtained when the data shown in FIG. 2 is processed to detect peaks using the code listed below in Appendix A. FIG. 3*a* shows the peaks in the robot call distribution of FIG. 2*a* and FIG. 3*b* shows the peaks in the non-robot call distribution of FIG. 2*b*. The data shown in FIGS. 2*a* & 3*a* correspond to robot call distribution 3 from Table 1 above and the data shown in FIGS. 2*b* & 3*b* correspond to non-robot call distribution 3 from Table 2 above.

It can be seen from the discussion above that it is possible to differentiate between robot calls and non-robot calls by analysing the distribution of call durations from a given calling-party. For example, and without limitation, a source of robot calls could be identified by the identification of one or more of the following features:

Two or more peaks detected

First peak in the range 0-10 seconds

Median call duration typically below 20 seconds

Final peak in the range 25 to 50 seconds

Final peak close to or greater than the 75th percentile of distribution of call duration.

It should be noted that the final peak in the robot call distributions, which is believed to be driven by calls terminating on answering machines, is very pronounced or distinct, in that the peak density value is significantly greater than the density of nearby call durations.

It should be considered that the entities who generate these unwanted calls may use the same caller line identity (CLI) for both robot calls and non-robot calls, that is for unsolicited calls which are made by human operators. Whilst such an approach may change the distribution of call durations it is still likely that the distribution will still comprise multiple peaks and the peak which occurs at, or near to, the end of the distribution of robot calls. Thus, it should still be possible to identify the presence of the robot calls and take further action.

Figure 4:
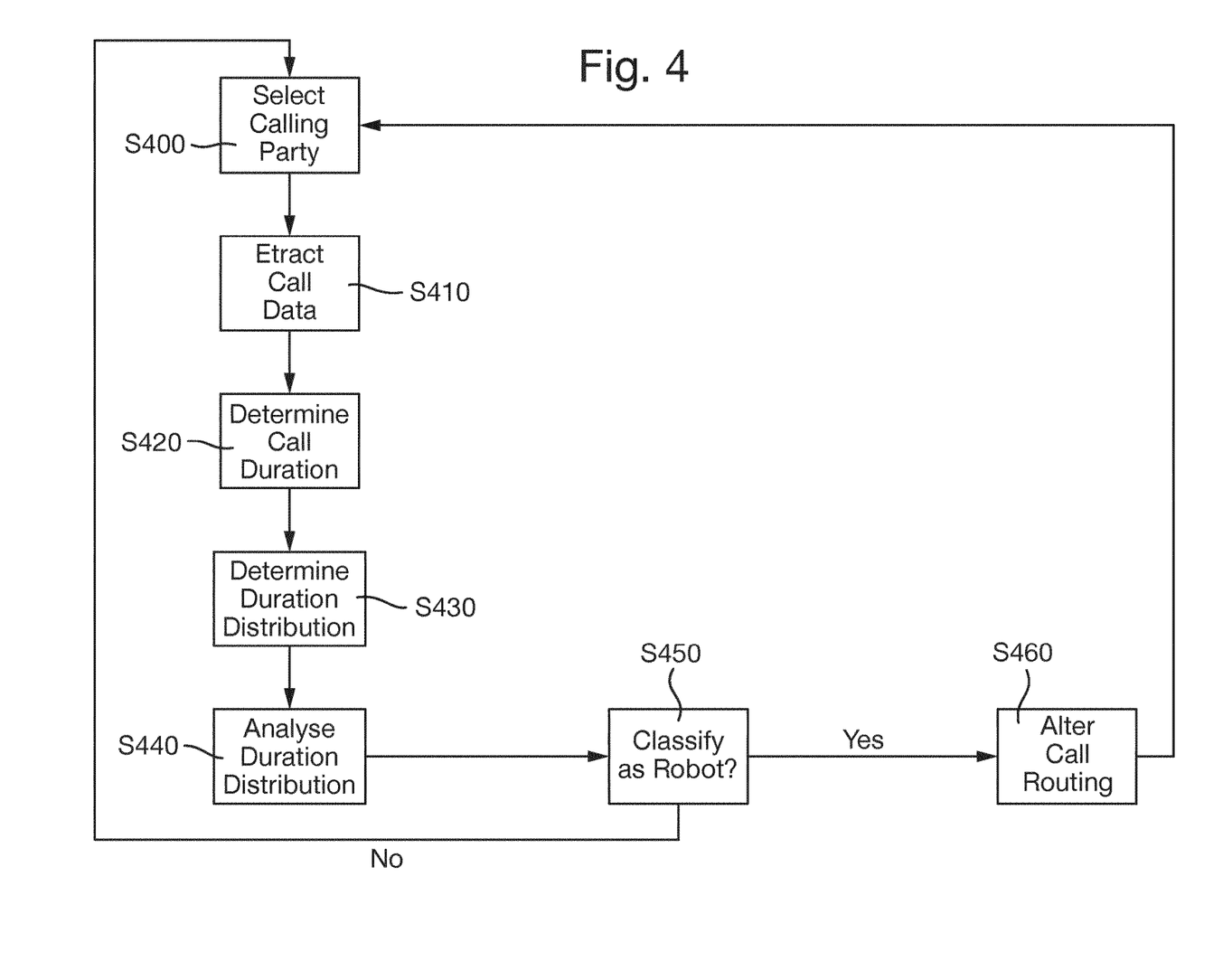
FIG. 4 shows a flowchart which describes how a method according to the present invention can be implemented.

FIG. 4 shows a flowchart which describes how a method according to the present invention can be implemented. At step S400 a calling party is selected and then at step S410 call data is extracted for that calling party for a predetermined time period. At step S420 the call data for the identified calling party is processed in order to determine the duration of each of the calls made by the identified calling party in the particular time period. At step S430 the call duration distribution is determined and at step S440 the call duration distribution, as has been discussed above. At step S450, if the analysis of the call duration distribution indicates that the calls made were not robot calls then the process returns to step S400 and a further calling party is selected. If the analysis indicates that the calls made by the identified calling party in the particular time period were robot calls then the call routing for future calls for that calling party will be altered.

Figure 5:
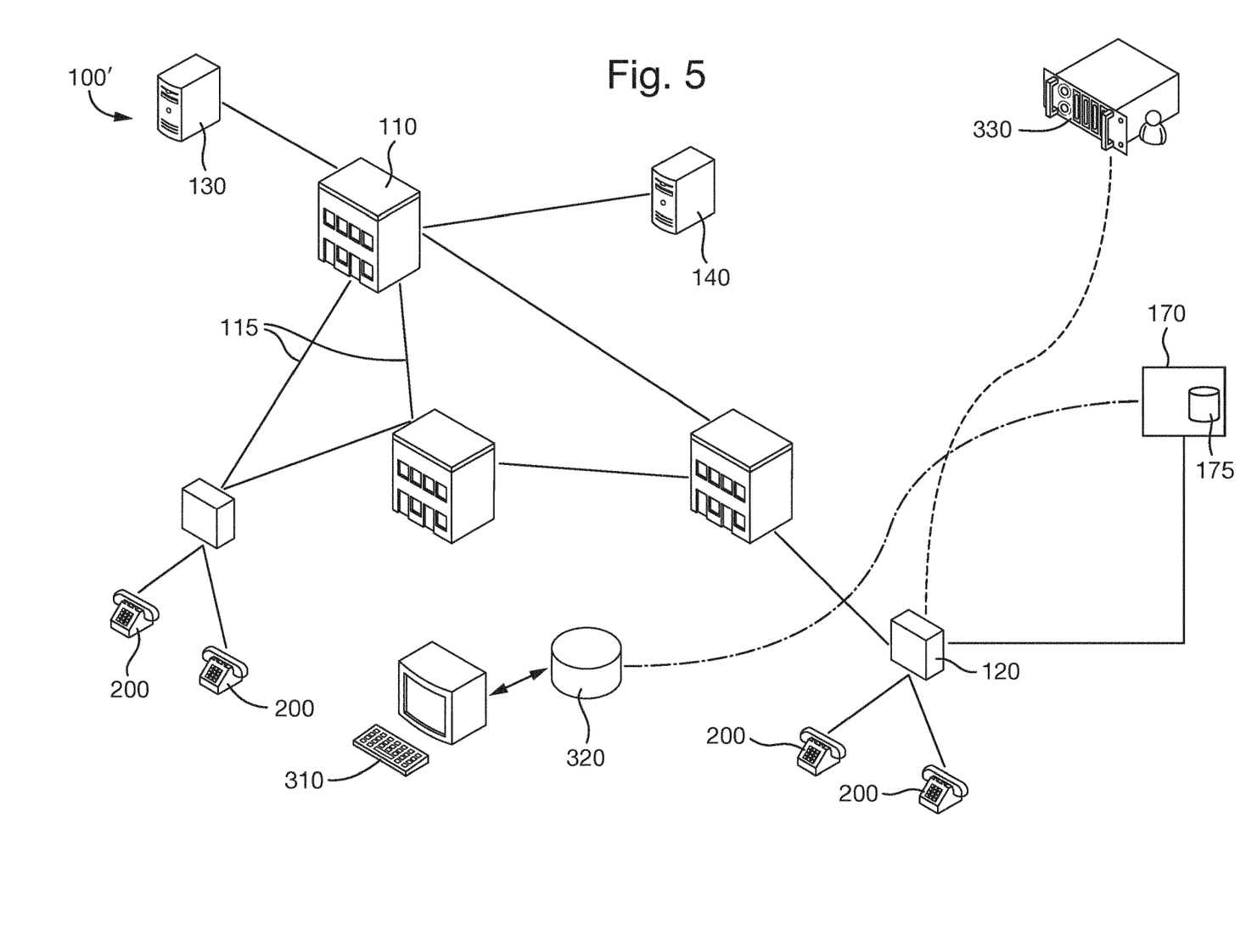
FIG. 5 shows a schematic depiction of a telephony network configured to implement a method according to the present invention.

FIG. 5 shows a schematic depiction of a telephony network 100' configured to implement a method according to the present invention. The telephony network 100' comprises a plurality of core exchanges 110 that are interconnected by a plurality of communications links 115. Each of the plurality of core exchanges 110 are further connected to one or more local exchanges 120 by further communications links and customers' telephony terminals 200 are connected to one of the plurality of local exchanges. The telephony network 100' also comprises one or more domestic gateways 130 and one or more international gateways 140.

The network 100' further comprises call datastore 320 and call analyst terminal 310. Call data is periodically supplied to call datastore 320 and represents some or all of the telephony calls made over the network for a given period of time. Each call data record will comprise the telephone number used by the calling party, the telephone number of the called party, the time that the call started and the time that the call was terminated. Based on this, the call analyst terminal 310 can analyse the call data held within the call datastore 320 to:

determine the number of calls made by a particular calling party within a particular time period (S410)
determine the duration of each of those calls (S420)
determine a call duration distribution for those calls (S430)
analyse the call duration distribution (S440) and
classify the calls as robot calls or non-robot calls (S450).

If the calls made by a particular calling party are classified as being non-robot calls then a further calling party can be selected and the method re-iterated.

If the calls made by the calling party are classified as being robot calls then the call analyst terminal will transmit a message to an intelligent network (IN) platform 170 indicating that the calling party is making robot calls using a specific number. The IN platform will store that number within a blacklist datastore 175. When an incoming call is received at a local exchange the call hits an IN trigger which suspends normal call processing, and passes control to the IN. The IN will compare the CLI of the incoming call with the numbers stored within the blacklist datastore 175. If the CLI of the incoming call matches a number held in the blacklist datastore 175 then the local exchange will be instructed to route the call to a voicemail server 330. If the CLI of the incoming call does not match a number held in the blacklist datastore then the IN instructs the local exchange to continue normal processing and thus the call proceeds to ring the customer. If a call is routed to the voicemail server then a notification will then be sent to the customer informing them that a calling party attempted to make a robot call to them. For example, the customer may be sent an email indicating that a robot call has been received, with a hyperlink which can be activated in order to allow the customer to access the contents of the robot call as and when they wish to do so, a notification may be sent to a computer or smartphone app, an SMS message may be sent, etc.

It will be understood that the present invention relates to a method of classifying a source of telephone calls to determine whether they can be classified as robot calls or non-robot calls. It will be further understood that exact details of how these calls are then processed are not directly relevant to the present invention and that alternative schemes to that outlined above with respect to FIG. 5 may be used. Some large users of the telephony network (banks, government agencies, etc.) will make many calls each day but that these calls will be in the main non-robot calls or will be a source of legitimate robot calls. The network operator may establish a whitelist of telephone numbers used by such entities which will be generating large numbers of calls. Telephone numbers on this whitelist will not be analysed in accordance with the method described above.

The call analyst terminal will also need to select the telephone numbers which are to be analysed. This may be done by selecting all the telephone numbers which make more than a threshold number of calls in a pre-determined time period, for example selecting all of the numbers which generate in excess of 5000 calls per day, for example, or selecting all of the numbers which generate calls at a rate in excess of 20 calls per minute, for example. Alternatively, or in addition, the telephone numbers which generate the most calls may be selected, for example the 1000 telephone numbers which made the most calls in the preceding day. If a particular telephone number is added to the 'robot caller list' then the owner of the that number may be informed by the network operator. The network operator may provide a mechanism by which such numbers can be removed from the 'robot caller list'. The entities which make large numbers of unwanted robot calls typically lease telephone numbers from third party brokers and thus are likely to move from number to number as they are added to the 'robot caller list'.

The method described above requires a call data source which comprises the telephone number used by the calling party, the telephone number of the called party, the time that the call started and the time that the call was terminated. It will be understood that this data could be created solely for the purpose of implementing the method according to the present invention but it is preferred that an existing source of data can be re-used. For example, the billing data which is created for each telephone call could be used. To simplify processing, additional data which is held in the billing data may be removed before it is made available to the call analyst terminal.

The foregoing discussion has been focussed on the use of the present invention to detect, and then re-route, unwanted robot calls in a conventional PSTN network. It will be understood that the present invention could also be used to detect unwanted robot calls made using IP-based voice services, for example voice over IP calls. In this case the call data source will comprise a unique identifier of the calling party which may comprise an email address, a SIP address, a conventional telephone number or other unique identifier. Similarly, the call data source may comprise a unique identifier for the called party, which again may comprise an email address, a SIP address, a conventional telephone number or other unique identifier.

As the present invention is implemented on software within a conventional computing terminal, computer code may be accessed via download, for example via the internet from an ISP, or on some physical media, for example, DVD, CD-ROM, USB memory stick, etc. for which the terminal has an appropriate media reader. The call analyst terminal and the blacklist datastore may be implemented using a single terminal as shown above in FIG. 5 but it will be understood that distributed computing or cloud technology may be used such that a plurality of call analyst terminals are analysing call data, with numbers which are classified as being robot calls being distributed amongst a number of blacklist datastores.

According to an aspect, the present invention provides a method of classifying unwanted robot calls on the basis of the duration of a plurality of calls made from a single telephone number. If analysis of the distribution of call duration indicates that the calls are robot calls then the single telephone number is flagged such that subsequent calls from that number are not connected to the called party.

APPENDIX A

```
library(MALDIquant)

This is MALDIquant version 1.15
Quantitative Analysis of Mass Spectrometry Data
See '?MALDIquant' for more information about this package.
get.peaks=function(data, from=2,to=200, threshold=0.01)
{
    d = density(data, from=from, to=to)
    ms.d = createMassSpectrum(mass=d$x,intensity=d$y)
    ms.d.peaks = detectPeaks(ms.d,method="MAD",halfWindowSize=5)
    if(length(ms.d.peaks)>1) # only filter if num peaks > 1
    {
        ms.d.peaks = ms.d.peaks[which(ms.d.peaks@intensity > threshold)] # threshold to reject low intensity peaks
    }
    return(ms.d.peaks)
}
get.num.peaks=function(peaks)
{
    return(length(peaks))
}
get.duration=function(peaks,num)
{
    if (num > length(peaks))
    {
        return (NA);
    }
    return(peaks@mass[num])
}
plot.peaks = function(data, title="", from=2,to=200)
{
    p = get.peaks(data,from=from,to=to)
    npeaks=get.num.peaks(p)
    plot(density(data, from=from, to=to),main=title)
    abline(v=p@mass,col="red")
}
```

The invention claimed is:

1. A method of processing a call in a communications network, the method comprising the steps of:
   determining the duration of a call for each of a plurality of calls from a first network identity;
   generating a distribution of call durations;
   classifying the plurality of calls from the first network identity in accordance with the distribution of call durations, wherein a call is classified as an unwanted automated call if the distribution of call duration values comprises two or more peaks;
   routing further calls from the first network identity in accordance with the classification of the plurality of calls.

2. A method according to claim 1, wherein a call is classified as an unwanted automated call if the first peak in the distribution of call duration values occurs at a time of less than 10 seconds.

3. A method according to claim 1, wherein a call is classified as an unwanted automated call if the median call duration is less than 20 seconds.

4. A method according to claim 1, wherein a call is classified as an unwanted automated call if the final peak in the distribution of call duration values occurs at a time of greater than 25 seconds.

5. A method according to claim 4, wherein a call is classified as an unwanted automated call if the final peak in the distribution of call duration values occurs at a time of less than 50 seconds.

6. A method according to claim 1, wherein a call is classified as an unwanted automated call if the final peak in the distribution of call duration values occurs at or after the 75th percentile of the distribution of call duration values.

7. A method according to claim 1, wherein a call which is classified as an unwanted automated call is delivered to a voicemail server.

8. A method according to claim 1, wherein a call which is not classified as an unwanted automated call is delivered to the original called number.

9. A method according to claim 7, wherein a notification is transmitted to a further communications address associated with the original called number.

10. A computing terminal comprising a processor for executing code such that the computing terminal is at least configured to:
    determine the duration of a call for each of a plurality of calls from a first network identity;
    generate a distribution of call durations:
    classify the plurality of calls from the first network identity in accordance with the distribution of call durations, wherein a call is classified as an unwanted automated call if the distribution of call duration values comprises two or more peaks; and
    route further calls from the first network identity in accordance with the classification of the plurality of calls.

11. A non-transitory computer-readable storage medium storing computer executable code for performing a method according to claim 1.

12. A method according to claim 1, wherein a call is classified as an unwanted automated call if a first peak of the two or more peaks occurs at a time of less than 10 seconds, a median call duration is less than 20 seconds, and a final peak of the two or more peaks occurs at a time of greater than 25 seconds.

13. A computing terminal according to claim 10, wherein a call is classified as an unwanted automated call if a first peak of the two or more peaks occurs at a time of less than 10 seconds, a median call duration is less than 20 seconds, and a final peak of the two or more peaks occurs at a time of greater than 25 seconds.

* * * * *